Oct. 31, 1944.  J. F. MURPHY  2,361,411
DISTILLATION OF FATTY ACIDS
Filed Nov. 10, 1941
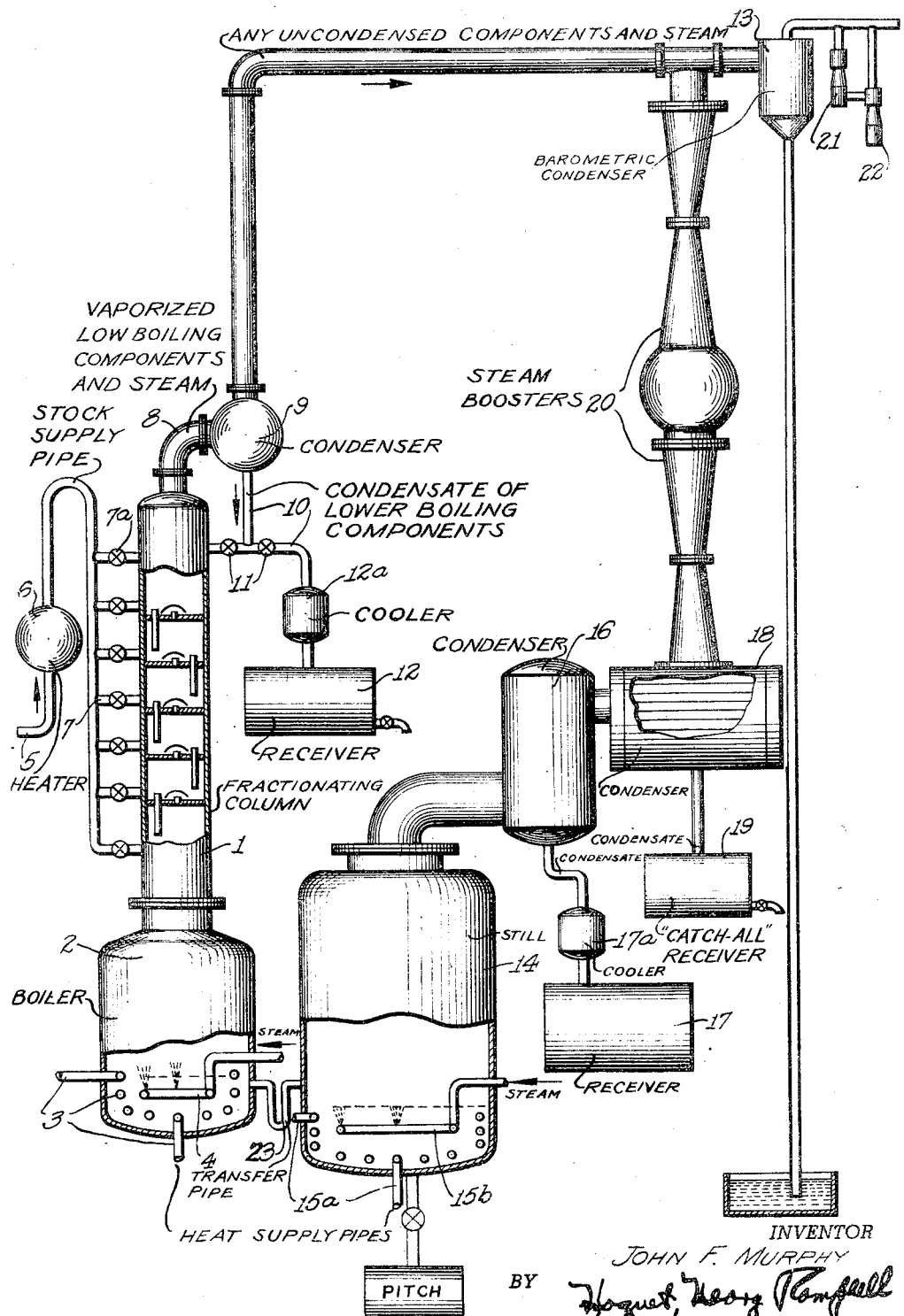
INVENTOR
JOHN F. MURPHY
BY
ATTORNEYS Patented Oct. 31, 1944

2,361,411

UNITED STATES PATENT OFFICE 2,361,411

DISTILLATION OF FATTY ACIDS

John F. Murphy, Fitchburg, Mass., assignor to Lever Brothers Company, Cambridge, Mass., a corporation of Maine Application November 10, 1941, Serial No. 418,510

12 Claims. (Cl. 202—52)

The present invention relates to the treatment of fatty acid stocks, and more particularly, to a method of subjecting fatty acid stock which is susceptible to improvement, particularly with respect to color or odor, to a treatment for removing substances present in the stock which renders it unsuitable for many commercial uses. The method of this invention may be used, for example, to improve the color, odor and other characteristics of the fatty acid stock obtained by conventional fat splitting operations, the acidification of "foots" or by any other method, to form products of improved characteristics which are suitable for various uses, for example in the manufacture of high grade soaps.

The expression "fatty acid stock" is used to refer to fatty acids from any source and of the same or different molecular weight, alone or in admixture with smaller amounts of other compounds, usually objectionable odorous and coloring substances.

The fatty acid stock may be obtained from any source. Generally it is obtained from esters or salts of the acids. Splitting or separating of fatty acids from esters containing them may be accomplished in a variety of ways. For example, the oil, fat or grease may be saponified by the so-called Twitchell method. It is also possible to derive the fatty acids from their esters by hydrolysis with water under high temperature and pressure conditions in an autoclave, either continuously or in a batch operation with or without the addition of other catalysts. Soaps which are by-products or waste products from the oil or paper industry may be acidified to yield fatty acids. Another source of fatty acids may be the distillation of free fatty acids from oils and fats. The selection of the source of the fatty acids or a method of splitting or separating the fatty acids from the other components in the stock does not constitute a part of the present invention, and the foregoing is given merely for purposes of illustration. It is intended that the method of the present invention for treating fatty acids may be used to prepare valuable products out of fatty acids derived from any source and by any method desired.

In general, the undesirable components which render the fatty acids unsuitable for most uses, and which it is desired to eliminate to form substantially pure fatty acids suitable for use, for example as a high grade soap stock, may be classified into two groups. The first group consists of components having lower boiling points than the desired fatty acids, including, for example, the nitrogenous odorous impurities, as well as additional undesirable components formed by thermal decomposition. Generally these components include odorous and coloring constituents. In addition, in the case of fatty acids derived from certain oils, the components of this group may include substantial portions of low boiling unwanted fatty acids. The second group consists of components having higher boiling points than the fatty acids, designated in the art as "pitch" and which includes a small amount of unsplit glycerides. The ingredients in this group also may comprise odorous and coloring constituents.

Fatty acids suitable for use without substantial purification may be obtained in some instances by splitting highly refined oils and fats of good quality, but it is apparent that the production of fatty acid stocks from such premium oils and fats for use in making soaps is not advantageous. The more economical sources of fatty acids are the many fat-containing commercial by-products, such as "foots" from oil refining, garbage greases, tall oil and dark and odorous greases and oils in general which, in most cases, are waste products. Fatty acid stock derived from such sources by conventional methods, however possesses objectionable odor and color characteristics. Even when refined by ordinary processes, the makers of better soaps regard the fatty acid stock derived from these sources as unsuitable for use in making a high quality soap. It is an advantage of this invention that the fatty acid stock derived from these last named sources may be refined and purified in accordance with the method of this invention to such an extent that it may be utilized in many commercial operations, such as the manufacture of high grade soaps, which require the use of substantially pure fatty acids, free from color, odor, and other characteristics heretofore believed to be unobtainable from low grade sources.

The method of this invention comprises the combination of a preliminary stripping operation under conditions of reduced pressure and elevated temperature to remove the first mentioned group of undesirable components having lower boiling points than the desired fatty acids, followed by a distillation operation, under a still lower pressure and at a lower temperature, to separate the fatty acids from the components having higher boiling points. In this manner the substantially pure and desirable fatty acids may be freed efficiently, in successive steps, from substantially all of the objectionable ingredients present in admixtures in fatty acid stock prepared in a conventional manner from low grade or less desirable sources.

In the preliminary stripping operation, hot liquid fatty acid stock is treated in a fractionating tower maintained under reduced pressure. The tower preferably is connected with a conventional boiler, provided with means for supplying heat and steam, if desired, to accomplish a fractionation of the charge by volatilizing and separating the low boiling impurities. The low boiling impurities including a quantity of lower molecular weight fatty acids, if desired, are removed from the top of the fractionating tower, while the fatty acids, and undesirable higher boiling components accumulate in the boiler.

The materials which collect in the boiler as described above are then treated by distillation, in a still maintained at as low a pressure as is feasible, preferably in the neighborhood of 1 to 4 mm. absolute, which pressure is lower than that in the boiler, and consequently the temperature of the stock in the still during distillation is lower than that in the boiler. Sufficient heat may be applied in the second boiler to volatilize substantially all of the fatty acids, while retaining the pitch and unsplit glycerides in a liquid state in the still. If desired, the temperature may be raised at the end point of the distillation to force the distillation as nearly to completion as possible. My process is not to be construed as excluding the use, in conjunction therewith, of all such variations and additional steps, or both, as are apparent to one skilled in the art.

Means such as baffles may be utilized to prevent entrainment of the pitch and the unsplit glycerides in the fatty acid vapors. The volatilized fatty acids are conducted to a separate condenser wherein they are liquefied in a condition substantially free from all undesirable components.

In order that the invention may be more readily understood, reference may be had to the drawings which set forth in schematic form, an apparatus of the type which may be utilized in carrying out the treatment of fatty acids continuously in accordance with this invention.

The apparatus for accomplishing the preliminary stripping comprises a fractionating tower 1, which may be, for example, a conventional bubble plate column or a packed tower, connected to a boiler 2, which may be provided with closed coils 3 through which a heating medium is passed for heating the stock in the system. A perforated steam coil 4 may be provided for admitting open steam to the boiler to facilitate the stripping operation. A conduit 5 connected with the supply of fatty acid stock to be treated is provided, if desired, with a heat interchanger 6 for adjusting the temperature of the liquid fatty acid stock prior to its admission to the fractionating tower through any one of a series of conduits 7 communicating through valves 7a with various plates or levels in the fractionating tower. The top of the fractionating tower is connected by means of a conduit 8 with a condenser 9 for condensing the vaporized material withdrawn. Conduits 10 and suitable valves 11 may be provided for returning a part of the condensate to the tower or for collecting it in a receiver 12, or both. A cooler 12a may be used to cool the condensate before it flows to the receiver. The condenser 9 in turn is connected with a vacuum apparatus including a barometric condenser 13 to be described more particularly hereinafter.

The distillation apparatus comprises a still 14 which may be provided with closed heating coils 15a for heating the material therein and effecting the desired volatilization of the fatty acids, and open steam coils 15b for admitting steam if this is desired. The still communicates at its upper end with a condenser 16, preferably cooled by air, where the major portion of the vapor is condensed. A receiver 17 is connected to the condenser for receiving the purified fatty acids collected therein, after they have passed through a cooler 17a.

Any portion of the vapor that is not condensed in the condenser 16 passes to a water-cooled condenser 18, and the condensate removed to a "catch-all" 19.

The condensers 16 and 18 are connected to the barometric condenser 13 by way of one or more boosters 20 provided between the condensers 16 and 18 and the barometric condenser 13 for maintaining a lower pressure on the distillation apparatus than is maintained on the stripping apparatus. Additional condensers and air ejectors 21 and 22 for creating the vacuum are provided in accordance with the conventional practice.

The boiler 2 and the still 14 are connected together by means of an overflow pipe 23 whereby the material which collects in the boiler 2 above a predetermined level may flow continuously into the still 14. A trap is provided in the overflow pipe to form a liquid seal between the boiler 2 and the still 14. This is necessary since the boiler and the still operate at different pressures.

In carrying out the invention in the above described apparatus, it is advantageous that the fatty acid stock be admitted to the system as a liquid feed. The temperature of the fatty acids preferably is adjusted in the heat interchanger 6 to a temperature of about that existing in the fractionating tower at the point of admission, preferably intermediate the ends of the fractionating tower. By means of the valves 7a the fatty acid stock may be admitted to the tower at a point intermediate thereof which is at the temperature of the fatty acid feed. In carrying out the operation, however, particularly if a batch operation is utilized, it is not essential to admit the fatty acid feed to the fractionating tower, and it may be added directly to the boiler 2, if preferred. In the operation of the fractionating tower, the higher boiling components, generally fatty acids, pitch and coloring matter, travel downwardly through the various plates of the tower and are collected in the boiler. The lower boiling materials, consisting mostly of the impurities, and including any unwanted lower molecular weight fatty acids, are vaporized and move upwardly through the fractionating tower and may be removed from the top. The additional heat required for the stripping of the low boiling components is provided by the heating coils 3 in the boiler 2. The admission of open steam through the coil 4 to facilitate fractionation, and the amount of steam, may be governed by the material being treated, the results desired and the conditions of operation.

It is possible to utilize a fractionating tower which is sufficiently long to effect a substantially complete separation of the undesirable low boiling components. For convenience, however, it is preferred frequently to utilize a smaller tower and reflux a portion of the distillate, in accordance with the well known practice of operating a fractionating tower. The amount of distillate withdrawn in the receiver 12 will vary with the character of the stock treated and the final product desired, but in general it will be 3 to 25% of the amount fed into the column.

If desired, the portion of the distillate which is retained in the receiver 12 may be reboiled and fractionated in separate apparatus (not shown in the drawing) to separate a higher boiling portion which may be returned to the tower.

Since the top of the column is connected directly to the barometric condenser the pressure is not particularly low and the pressure at the top of the column will be of the order of 20 to 40 mm. absolute. There is a further pressure drop through each plate so that the pressure in the boiler 2 is somewhat higher, for example of the order of 25 to 50 mm. absolute depending on the number of plates in the column and conditions of operation.

The materials accumulating in the boiler 2, which comprise the fatty acids and the higher boiling components from which the lower boiling components have been stripped by the fractionating column, pass by means of the overflow pipe 23 to the still 14 wherein substantially all of the fatty acids are vaporized. The pressure on the distillation apparatus is maintained as low as possible preferably in the neighborhood of 1 to 4 mm. absolute. Insufficient heat is applied, however, to vaporize the high boiling impurities.

The pitch and the unsplit glycerides accumulate in the bottom of the still 14 and may be withdrawn therefrom continuously or intermittently as desired. Substantially all of the remaining fatty acids may be vaporized and carried over to the condensers 16 and 18 wherein they are condensed and are thus collected for subsequent use. About 80 to 98 percent of the distillate will be collected in the condenser 16 and the balance of the condensable components are recovered in the condenser 18 and reworked by returning them from the "catch-all" 19 to the stripping column. This provides a convenient way of separating any lighter fraction that may be in the still 14.

Inasmuch as a lower pressure is maintained on the still 14 than is maintained in the preliminary stripping apparatus, a lower temperature may be utilized for carrying out the distillation step of the process. As stated above, the raw fatty acids prepared in a conventional manner contain a number of components which, upon the application of heat, may be formed into undesirable odor or color forming bodies. In view of the higher temperature conditions prevailing in the preliminary stripping step, and boiler 2, substantially all thermal decomposition which might take place in the process will occur during this operation. Inasmuch as all of the lower boiling components and thermal decomposition products are removed in the preliminary stripping operation, it is an advantage of this invention that substantially all of the undesirable products of thermal decomposition will be formed and effectively removed before distillation of the fatty acids, and substantially none of the impurities will be present or formed in the fatty acids which are vaporized in the distillation operation. If desired, however, a fractionating tower may be utilized in place of the condenser 16 to insure the removal of all of the odorous and color forming bodies at the last stage of the process. The use of a fractionating tower at this stage, however, is generally not desirable because of the undesirable pressure losses therein, with the result that it would be practically impossible to have a desired low pressure in the still 14, for example, of the order of 1 to 4 mm. on the still.

It is also an advantage of the method of this invention that the fatty acids which constitute the major portion of the distillate, may be vaporized in a distillation operation under minimum pressure conditions and therefore at maximum efficiency because of the avoidance of a substantial pressure drop between the still 14 and the vacuum apparatus inasmuch as a fractionating tower is not required in this part of the system.

While in the preliminary stripping operation the use of a fractioning tower lowers the efficiency of this operation, because the loss in efficiency is proportional to the drop in pressure in the column, this less efficient system is used to distill only a small portion of the total amount of material that is separated by distillation in the entire process. Furthermore, this column operates at the relatively higher pressures where the loss due to the fractionating column does not represent such a high proportion of the total cost as would be the case if a column were used with lower pressures.

It will be apparent that the method of this invention is a distinct improvement over a method which accomplishes a stripping and distillation step in one operation. In this latter type of operation, the entire process is carried out under conditions of inefficient operation, whereas in the method of the present invention, the distillation of substantially all of the fatty acids, if desired, may be carried out under the optimum conditions of operation.

Another advantage of the process resides in the utilization of a liquid feed for the fatty acid stock being purified. This enables the use of a somewhat smaller fractionating column and feeding arrangement, and hence results in much smaller radiation losses. It also permits more flexible operation, since the relative position in the column at which the stock is fed is readily adjustable by means of the relatively small pipes 7 and valves 7a. It is advantageous to be able to control the position in the column at which the feed is introduced, depending upon the characteristics of the stock and the conditions of operation within the column. It would not be practical to have such flexibility with vapor feed, since large conduits are required to convey the vapor to the column, and these with large valves are too cumbersome and entertain much too large radiation losses to be practical.

The fatty acids product collected in the condenser 16 and separated as described above are free from substantially all of the undesirable lower boiling and higher boiling components. As a result, the product is improved with respect to color, odor, stability against color and odor reversion, and other characteristics to such an extent that regardless of source, the fatty acids produced in accordance with the invention are comparable to those that have been "double-distilled" by conventional distillation processes. The fatty acids made by the process described herein are suitable for most commercial uses including, for example, the making of high grade soaps free from any so-called "pitchy" odor.

As stated above, the conditions of operation in accordance with the invention may vary over a wide range depending, for example, upon the characteristics of the materials to be treated and the results it is desired to accomplish. In order that the invention may be completely understood, however, there is described hereinafter two actual operations carried out in the apparatus described above in accordance with the invention. It will be appreciated that these examples are given merely by way of illustration, and are not intended to be construed as a limitation upon the operations which may be carried out in accordance with the invention.

In the first example the material treated was crude fatty acid stock derived from coconut oil and having a characteristic very dark color. The fatty acid stock was admitted to the column at a rate of about 700 pounds per hour. During the distillation the temperature at the top of the column was about 320° F. and the pressure at the top of the column was about 30-40 mm. The temperature in the boiler at the bottom of the column was about 430° F. The still of the second unit was operated at a temperature of about 360-380° F. and at a pressure of about 4 mm. The volatile color and odor impurities and lower boiling fatty acids amounting to 28% of the stock were distilled off from the top of the column. No reflux was utilized in this particular run. The pitch retained in the still of the second unit amounted to about 7% of the stock. The final fatty acid product which was distilled off in the second unit and recovered in the condenser exhibited a color of 1.0 red, 10.0 yellow, when measured in a Lovibond tintometer utilizing a 5¼" column.

In the second example the materials treated were crude fatty acid stock derived from soy bean oil foots and having a characteristic black color. The crude fatty acid stock was admitted in the column at the rate of 700 pounds per hour. The temperature at the top of the column was about 320° F. at about 30-40 mm. pressure. The temperature in the boiler at the bottom of the column was about 480° F. In this operation a reflux ratio of about 6:1 was utilized and only about 5% of the stock was removed at the top of the column. The still of the second unit was maintained at a temperature of about 410-430° F. and at a pressure of about 4 mm. The amount of pitch retained in the still of the second unit amounted to about 15% of the stock. The final fatty acid product exhibited a color of about 1.5 red and 15 yellow when measured in a Lovibond tintometer utilizing a 5¼" column.

It will be appreciated that the final fatty acid products obtained in the operations described in the examples above were of especially good color, particularly when the sources of the fatty acids are considered. As a result the fatty acid product produced in accordance with the invention even though derived from low grade material is suitable for use in the manufacture of high grade soaps. Moreover, as shown in the examples, the operations may be carried out in a convenient manner and under conditions of operation which may be readily obtained in an efficient manner as described heretofore.

The method of this invention may be susceptible to variation by one skilled in the art, and all such variations are intended to be included as one within the scope of the following claims.

I claim:

1. A method of obtaining fatty acids of improved color and odor from fatty acid stock containing unwanted components having higher and lower boiling temperature ranges than said fatty acids by two successive stages of treatment, comprising fractionating the fatty acid stock in a fractionating zone with the application of heat and under reduced pressure to remove the lower boiling components, withdrawing the stock from the fractionating zone and distilling the stock at a temperature lower than the highest temperature maintained in the fractionating zone and under a pressure lower than that maintained at any point in the fractionating zone during fractionation, to remove the fatty acids from the higher boiling components.

2. A method of obtaining fatty acids of improved color and odor from fatty acid stock containing unwanted components having higher and lower boiling temperature ranges than said fatty acids by two successive stages of treatment, comprising continuously fractionating the fatty acid stock with the application of heat and under reduced pressure to remove the lowest of the lower boiling components, and thereafter continuously distilling the fatty acids from which said lowest boiling components have been removed so as to vaporize the fatty acids at a temperature lower than that to which fatty acids were heated during the fractionation, to remove the fatty acids from the higher boiling components.

3. A method of obtaining fatty acids of improved color and odor from fatty acid stock containing unwanted components having higher and lower boiling temperature ranges than said fatty acids by two successive stages of treatment, comprising volatilizing and separating the lower boiling components from the fatty acids and the higher boiling components retained in liquid form by the application of heat and under reduced pressure, and thereafter, without heating the fatty acids to a temperature higher than that at which said lower boiling components were separated, volatilizing and separating the fatty acids from the higher boiling components retained in liquid form by the application of heat and under a lower pressure such that the volatilization and separation of the fatty acids is effected at a temperature below that required for the volatilization and separation of the lower boiling components.

4. A method of obtaining fatty acids of improved color and odor from fatty acid stock containing unwanted components having higher and lower boiling temperature ranges than said fatty acids by two successive stages of treatment, comprising volatilizing the lowest of said lower boiling components from the fatty acids and the higher boiling components in a fractionating column maintained under reduced pressure, condensing said volatilized lower boiling components, returning a portion of the condensate to the column and collecting the balance, and thereafter treating all of the remaining stock to volatilize the fatty acids from the higher boiling components in a still maintained under a reduced pressure such that the fatty acids are volatilized at a temperature lower than that existing in the fractionating column, and condensing and collecting the fatty acids.

5. A method of obtaining fatty acids of improved color and odor, comprising subjecting fatty acid stock to continuous fractionation and distillation in two successive stages, said fractionation being accomplished by feeding the fatty acid stock in liquid form to a heated fractionating column maintained at a subatmospheric pressure to remove lower boiling constituents, and said distillation being accomplished thereafter by vaporizing the fatty acids at a lower temperature than the highest temperature in said column and at a lower pressure than the lowest pressure in said column to remove the fatty acids from the higher boiling constituents.

6. A method of obtaining fatty acids of improved color and odor, comprising subjecting fatty acid stock to fractionation and distillation in two successive stages, said fractionation being accomplished by feeding the fatty acid stock in liquid form to a fractionating column maintained at a pressure of the order of 20 to 50 mm. and heated to a temperature to vaporize the lower boiling constituents, and said distillation being accomplished thereafter by vaporizing the fatty acids by the application of heat at a lower temperature than the highest temperature in said column and at a pressure of the order of below 1 to 10 mm. to remove the fatty acids from the higher boiling constituents.

7. A method of obtaining fatty acids of improved color and odor in two successive stages of treatment, comprising introducing liquid fatty acid stock into a fractionating zone, maintaining a sub-atmospheric pressure in said zone, applying heat in said zone sufficient to vaporize and separate from said fatty acids constituents of said stock boiling at a temperature below that of wanted fatty acids, thereafter introducing the fatty acids into a distillation zone, maintaining a sub-atmospheric pressure in said distillation zone lower than any maintained in the fractionating zone and a temperature in said distillation zone lower than the highest temperature in said fractionation zone, and applying heat in the distillation zone sufficient to vaporize and separate the fatty acids from constituents of said stock having a higher boiling point than said fatty acids.

8. A continuous method of treating fatty acid stock comprising continuously introducing fatty acid stock in liquid form into a fractionating zone comprising a boiler and a fractionating column, maintaining a sub-atmospheric pressure in said zone, applying heat to said boiler to vaporize low boiling impurities from the stock in said fractionating column, continuously removing low boiling impurities including the lowest boiling impurities at the top of the fractionating column, continuously collecting fatty acids substantially free from low boiling impurities in said boiler, continuously transferring fatty acids and high boiling impurities from said boiler directly to a distillation zone comprising a still and a condenser, maintaining a sub-atmospheric pressure in said distillation zone, applying heat to said still to vaporize the fatty acids from high boiling impurities at a temperature lower than the temperature in said boiler, continuously collecting the high boiling impurities in the still, and continuously collecting fatty acids substantially free from high and low boiling impurities in the condenser.

9. A continuous method of treating fatty acid stock comprising continuously introducing fatty acid stock in liquid form into a fractionating zone comprising a boiler and a fractionating column, maintaining a sub-atmospheric pressure of the order of 20 to 50 mm. at all points in said zone, applying heat to said boiler to vaporize low boiling impurities from the stock in said column, continuously removing vaporized low boiling impurities at the top of the fractionating column, continuously collecting fatty acids free from low boiling impurities in said boiler, continuously transferring fatty acids from said boiler to a distillation zone comprising a still and a condenser, maintaining a sub-atmospheric pressure of the order of less than 25 mm. in said distillation zone, applying heat to said still to vaporize the fatty acids from high boiling impurities at a temperature lower than the temperature in said boiler, continuously collecting fatty acids substantially free from high and low boiling impurities in said condenser, and continuously collecting high boiling impurities in said still.

10. A continuous method of separating fatty acids from a fatty acid stock having unwanted components of higher and lower boiling ranges than said fatty acids, comprising continuously introducing liquid fatty acid stock into a fractionating column maintained under reduced pressure, heating the stock before introduction into the column to a temperature substantially the same as the temperature in the column at the point of introduction, collecting the stock substantially free from lower boiling components in a boiler communicating with the bottom of the fractionating column, applying heat to the boiler to effect the vaporization of any lower boiling components in the fractionating column, continuously removing the lower boiling components adjacent the top of the fractionating column, condensing the vaporized components and refluxing a part of the condensate into the column, continuously transferring the fatty acid stock substantially free from lower boiling components directly to a still maintained at a pressure and temperature lower than that in said boiler, applying heat to the still sufficient to vaporize the fatty acids but insufficient to vaporize the higher boiling components, withdrawing the vaporized fatty acids substantially free from lower and higher boiling impurities adjacent the top of the still, and condensing the fatty acids so withdrawn.

11. The process recited in claim 10 in which the pressure in the boiler is not less than 30 mm., and the pressure in the still is not more than 4 mm.

12. A method of preparing a good grade of fatty acids for manufacturing soap from fatty acid stock obtained by splitting low grade fatty materials comprising subjecting the fatty acid stock to fractionation at an elevated temperature and sub-atmospheric pressure to remove the lowest boiling components, and thereafter without any intermediate heating of the remaining stock subjecting it to distillation at a lower temperature and pressure to remove the fatty acids from higher boiling components.

JOHN F. MURPHY.

DISCLAIMER 2,361,411.—*John F. Murphy*, Fitchburg, Mass. DISTILLATION OF FATTY ACIDS.
    Patent dated Oct. 31, 1944. Disclaimer filed Oct. 7, 1947, by the assignee,
    *Lever Brothers Company*.

Hereby enters this disclaimer of the following claims in said specification, to wit: claims 2, 4, and 12.

[*Official Gazette November 11, 1947.*]